United States Patent [19]

Pistiner et al.

[11] 4,023,752
[45] May 17, 1977

[54] ELIMINATION OF RESIDUAL SPACECRAFT NUTATION DUE TO PROPULSIVE TORQUES

[75] Inventors: Josef Siegfried Pistiner, Lafayette Hill, Pa.; Ludwig Muhlfelder, Livingston; John Edward Keigler, Princeton, both of N.J.

[73] Assignee: RCA Corporation, New York, N.Y.

[22] Filed: Mar. 13, 1975

[21] Appl. No.: 558,182

Related U.S. Application Data

[63] Continuation of Ser. No. 423,442, Dec. 10, 1973, abandoned.

[52] U.S. Cl. .................................................. 244/169
[51] Int. Cl.² .................................................. B64G 1/20
[58] Field of Search ............... 73/178 R; 235/150.2; 244/3.22, 164, 165, 169, 171

[56] References Cited

UNITED STATES PATENTS

| 2,974,594 | 3/1961 | Boehm | 244/169 |
| 3,135,479 | 6/1964 | Badewitz | 244/169 |
| 3,414,214 | 12/1968 | Robinson et al. | 244/169 |
| 3,695,554 | 10/1972 | Phillips | 244/165 |

Primary Examiner—Stephen G. Kunin
Attorney, Agent, or Firm—Edward J. Norton; H. Christoffersen; J. D. Lazar

[57] ABSTRACT

Spacecraft nutation caused by applying propulsive forces to a spacecraft along an axis which does not pass through the spacecraft's center of gravity is eliminated by a signal responsive control system which operates the propulsive forces for a predetermined time period which corresponds to an integral number of nutation periods.

7 Claims, 3 Drawing Figures

ELIMINATION OF RESIDUAL SPACECRAFT NUTATION DUE TO PROPULSIVE TORQUES

This is a continuation of application Ser. No. 423,442 filed Dec. 10, 1973, now abandoned.

CROSS REFERENCE TO RELATED APPLICATIONS

Of interest is the following copending patent application which is assigned to the same assignee as the present patent application: Ser. No. 423,441, filed Dec. 10, 1973, entitled "Minimization of Residual Spacecraft Nutation Due to Disturbing Torques" based on the invention of Kevin John Phillips.

BACKGROUND OF THE INVENTION

1. Field of the Invention

This invention relates to spacecraft propulsive torque control systems and is particularly directed to systems for controlling spacecraft nutation caused by external forces and torques used to change spacecraft attitude, orbit or velocity.

2. Description of the Prior Art

A problem frequently encountered in applying thrust forces from thrusters to a dual-spin or spin stabilized spacecraft for controlling spacecraft attitude, orbit or velocity is an undesirable spacecraft nutation or coning movement. Spacecraft nutation is caused by a torque due to a thrust force directed along an axis which does not pass through the spacecraft center of gravity. Such a thrust force will be referred to as a misaligned thrust force. The nutation causing torque resulting from the misaligned thrust force has a component at right angles to the spacecraft total momentum vector. Many systems have been proposed heretofore for controlling such undesirable spacecraft nutation. Some prior art attitude and/or orbit control systems use a combination of passive elements arranged to dissipate the undesirable spacecraft nutation. Other prior art attitude and orbit control systems counteract spacecraft nutation by use of an external force or forces generated by special spacecraft thrusters activated by electrical signals from sensors which detect spacecraft nutation.

A combination of special nutation counteracting thrusters and sensors or passive elements arranged solely for the dissipation or damping of spacecraft nutation due to misaligned thrust forces increase the complexity of spacecraft control system design. Accordingly, it is desirable to minimize spacecraft nutation caused by thrust misalignments without substantially increasing the complexity of spacecraft attitude and orbit control systems.

SUMMARY OF THE INVENTION

Spacecraft nutation caused by a misaligned thrust force is eliminated by a spacecraft control system comprising a force generating means connected to the spacecraft and operating in response to signals for maneuvering the spacecraft. Information signals transmitted to the spacecraft are received and processed by receiver means. The receiver means are arranged to transmit to the force generating means an output signal determining a force generating means operating period proportional to the product of an integral number times the inverse of said nutation frequency $\omega_n$.

DESCRIPTION OF THE PREFERRED EMBODIMENT

Figure 1A:
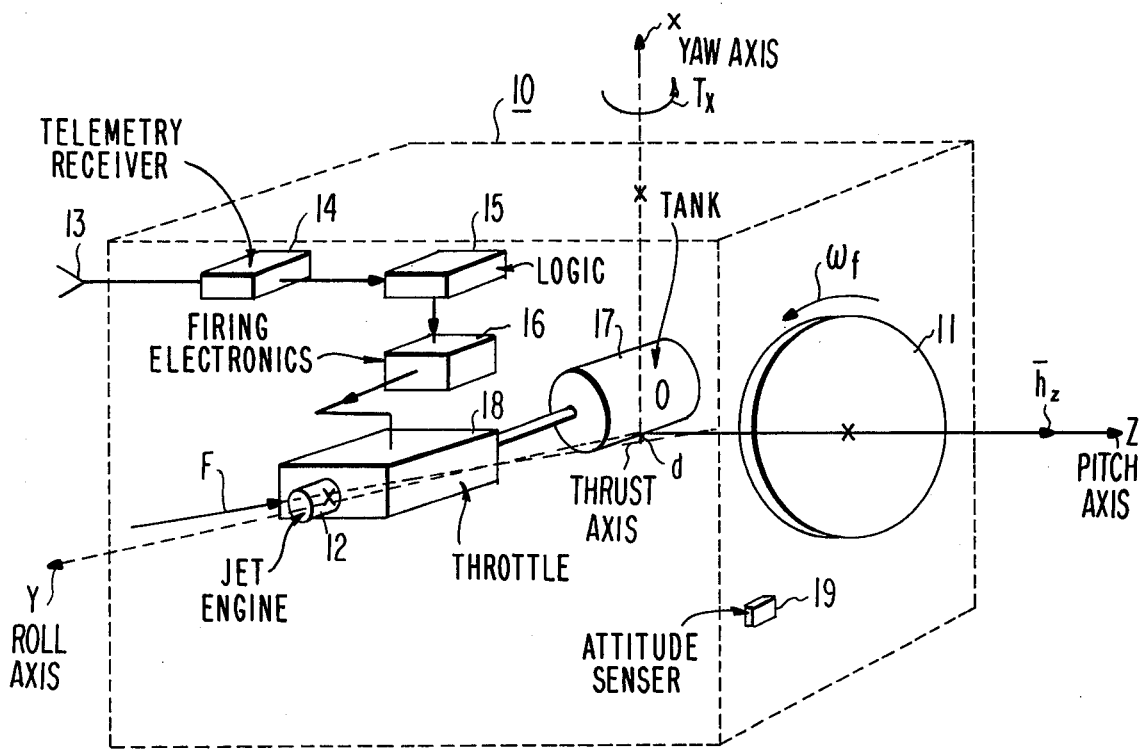
FIG. 1a is a diagrammatic representation of a de-spun spacecraft embodying the nutation control system of the present invention.

Orbiting spacecraft in one form or another often require a change in spacecraft attitude, orientation, or velocity in keeping with a desired spacecraft mission. Such spacecraft may be a spinning type in which the entire body spins, a dual-spin or a de-spun type containing a spinning momentum wheel de-spun from another portion of the body, both of which provide spacecraft gyroscopic stiffness as is well known in the art. For example, dual-spin satellite 10 which has platform 11 may be of the form shown in U.S. Pat. No. 3,695,554, issued on Oct. 3, 1972, to RCA Corporation based on the invention of Kevin John Phillips, entitled "Nutation Damping in Dual-Spin Spacecraft." Spinning, dual-spin and de-spun spacecraft have a total angular momentum represented as a vector, $\bar{H}$, preferably directed along or aligned with a spacecraft principal axis of inertia ($x$, $y$ or $z$). The angular momentum vector of a de-spun spacecraft is proportional to the angular velocity of the spinning momentum wheel and (in the absence of nutation) is directed along the principal axis about which the momentum wheel is spinning. When the total angular momentum vector, $\bar{H}$, is directed along the z axis, the x and y axes are in a plane transverse to the z axis. The x-y plane will be referred to as the transverse plane.

Thrusters capable of generating a force are appropriately mounted on the spacecraft. The thrusters are fired at a predetermined time for producing the necessary force or resulting spacecraft torque required to effect a desired change in spacecraft attitude, orientation or velocity. Spacecraft attitude may also be controlled in response to an applied torque from a spacecraft reaction wheel having a spin axis transverse to the primary momentum wheel. If the thrust axis, or the axis along which the thrust force or torque producing force is directed, does not pass through the spacecraft center of gravity, the resulting spacecraft torque, T, has a component orthogonal to the spacecraft total angular momentum vector resulting in an undesirable spacecraft nutation or wobble at frequency $\omega_n$. The spacecraft nutation frequency, $\omega_n$, is determined by:

$$\omega_n = \frac{H}{\sqrt{I_x \times I_y}} \quad \frac{\text{radians}}{\text{sec.}} \qquad (1)$$

where $H$ is the total spacecraft angular momentum, $I_x$ is the spacecraft moment of inertial about the $x$ axis, a principal axis of inertia in the transverse plane, and $I_y$ is the spacecraft moment of inertial about the $y$ axis, a principal axis of inertia orthogonal to the $x$ axis and also in the transverse plane.

Prior to nutation, the angular momentum vector, $\overline{H}$, of either a spinning spacecraft or a de-spun spacecraft, is preferably directed along or aligned with a spacecraft principal axis of inertial, for example, the z axis. When a spacecraft is subjected to a nutation causing torque, the spacecraft momentum vector, $\overline{H}$, will no longer be aligned with the z axis but will have a direction which varies with time in the x, y, z coordinate system, the torque vector and the thrusting period. A spacecraft subjected to nutation will have angular momentum components of the total spacecraft momentum vector, $\overline{H}$, in a plane transverse to the spin axis. In other words, the tip of the momentum vector, $\overline{H}$, of a spacecraft subjected to nutation, moves from an initial starting point along a predictable closed path in the x, y and z body coordinate system. Simultaneously, the tip of the spacecraft spin axis, z, (or spacecraft angular velocity vector $\omega_z$) moves in a small circle about the angular momentum vector, $\overline{H}$, arriving back at the initial starting point at the end of a predetermined nutation time period. The nutation time period, $\tau$, over which spacecraft angular velocity vector, $\omega_z$, will move about the closed path and arrive back at the same point of its cycle is determined by:

$$\tau = \frac{2\pi}{\omega_n} \tag{2}$$

where $\omega_n$ is determined by equation (1). If the disturbing torque is terminated at the end of time period $\tau$ or any integer multiple thereof, spacecraft residual nutation is minimized. Therefore, knowing the time period $\tau$ a control system is described below which turns on and thus activates a thruster or a torque generating means operating for a single nutation time period or an integer multiple thereof in order to eliminate spacecraft nutation.

Figure 1B:
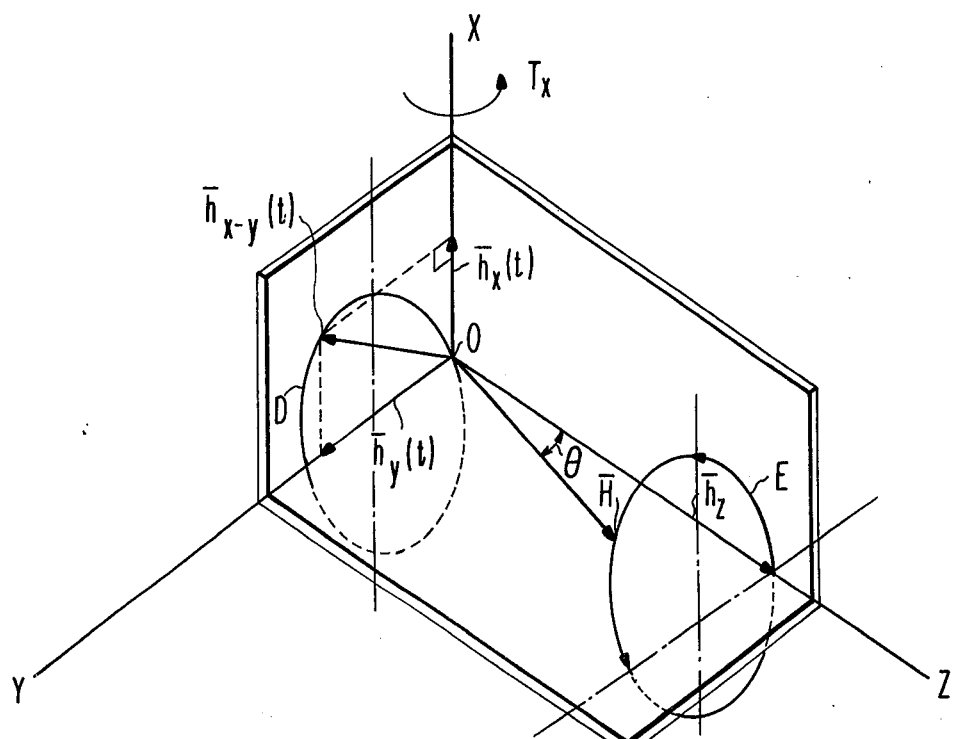
FIG. 1b is a graphical representation of a path over which a transverse angular momentum vector, $\bar{h}_{x-y}(t)$, and spacecraft angular momentum vector $\bar{H}$ may move in time within a spacecraft co-ordinate system over a spacecraft nutation cycle.

Referring to FIG. 1a, there is shown a de-spun spacecraft 10 having a momentum wheel 11 spinning in the counterclockwise direction shown about a spacecraft principal axis (z axis) with angular velocity, $\omega_f$. The operation of the spacecraft 10 will be described later. FIG. 1b is a graphical representation of the spacecraft's angular momentum vector, $\overline{H}$, when spacecraft 10 is subjected to a nutation causing torque, $T_x$. The spacecraft z axis will be referred to as the spin axis because it is the axis about which the momentum wheel 11 is spinning. In the absence of any externally applied disturbing torques, spacecraft momentum vector $\overline{H}$ is substantially equal to $\overline{h}_z$ and is aligned with the z axis. The magnitude of the spacecraft angular momentum, $h_z$, prior to nutation is determined by the equation:

$$h_z = \omega_f I_f \tag{3}$$

where $\omega_f$ is the angular velocity of momentum wheel 11 and $I_f$ is the moment of inertia or momentum wheel 11. It should be noted that the magnitude of total spacecraft momentum vector, $\overline{H}$, is substantially equal to the magnitude of spacecraft momentum vector $\overline{h}_z$ when the transverse momentum components of total momentum, $\overline{H}$, have a relatively small magnitude.

In the event a force, F, from thruster 12 is applied to spacecraft 10, it causes a system disturbing torque, $T_x$, (defined as a component of a total torque vector, $\overline{F} \times \overline{d}$, directed along the x axis, where $\overline{F}$ is the position vector of force F and $\overline{d}$ is the position vector of the perpendicular distance from the spacecraft center of mass, O, to the vector $\overline{F}$) about the spacecraft x axis or an axis transverse to the spin axis or z axis. Torque $T_x$ causes a time varying angular momentum in the transverse x-y plane of the spacecraft represented in FIG. 1b as a transverse angular momentum vector $\overline{h}_{x-y}(t)$ having a time varying component along the x axis, $\overline{h}_x(t)$ and a time varying component along the y axis, $\overline{h}_y(t)$. Thus, transverse angular momentum $\overline{h}_{x-y}(t)$ is equal to the vector sum of $\overline{h}_x(t) + \overline{h}_y(t)$. The magnitude and direction of the total spacecraft momentum vector, $\overline{H}$, is equal to the vector sum of $\overline{h}_x(t) + \overline{h}_y(t) + \overline{h}_z(t)$. The magnitude of the time varying angular momentum component, $\overline{h}_x(t)$, along the x axis is determined by the equation:

$$h_x(t) = \frac{T_x}{\omega_n} \sin \omega_n t \tag{4}$$

where $T_x$ is the magnitude of the applied torque about the x axis, t is time in seconds from when $T_x$ is first applied and $\omega_n$ is the spacecraft nutation frequency defined by equation (1). The magnitude of the time varying angular momentum component, $h_y(t)$ along the y axis is determined by the equation:

$$h_y(t) = \sqrt{\frac{I_y}{I_x}} \times \frac{T_x}{\omega_n} (1 - \cos \omega_n t) \tag{5}$$

where $I_y$ is the spacecraft moment of inertia about the y axis, $I_x$ is the spacecraft moment of inertia about the x axis, $T_x$ is the magnitude of the applied torque, t is time in seconds from when $T_x$ is first applied, and $\omega_n$ is the spacecraft nutation frequency defined by equation (1).

In a de-spun spacecraft, the tip of the transverse momentum vector, $\overline{h}_{x-y}(t)$, moves in an elliptical path, as a function of time, in the transverse x-y plane when the moment of inertia, $I_x$, about the x axis is not equal to the moment of inertia, $I_y$, about the y axis. It is apparent from equations (4) and (5) that the tip of the transverse momentum vector, $\overline{h}_{x-y}(t)$, moves in a circular path as a function of time in the transverse x-y plane when the moment of inertia, about the x axis, $I_x$, is equal to the moment of inertia, about the y axis, $I_y$.

Ellipse D in FIG. 1b graphically represents an elliptical path describing the movement, in time, of transverse momentum vector $\overline{h}_{x-y}(t)$ in response to the period and magnitude of applied torque $T_x$. Thus, ellipse D suggests that by selectively choosing the period or the time duration of the applied force, F, or resulting torque, $T_x$, to equal $\tau$, the magnitude of transverse momentum vector $\overline{h}_{x-y}(t)$ can be minimized since the magnitude of transverse momentum vector, $\overline{h}_{x-y}(t)$ is minimum at initial starting point O as illustrated in FIG. 1b.

Spacecraft nutation or coning is often referred to in terms of the half coning angle, $\theta$, determined by:

$$\theta \approx \frac{h_{x-y}(t)}{h_z} \tag{6}$$

where $h_{x-y}(t)$ is the transverse angular momentum previously defined and $h_z$ is defined by equation (3). As seen in FIG. 1b, the magnitude of transverse momentum vector $\overline{h}_{x-y}(t)$ and the half cone angle $\theta$ is minimum at origin O.

Referring again to FIG. 1(a), a command signal to fire or turn on thruster 12 and draw fuel, such as compressed gas or the like, from tank 17 for a known time period, τ, defined by equation (2), is transmitted from a ground station, not shown, to antenna 13 and telemetry or command receiver 14. The ground station command signal may be in response to a signal from a suitable attitude sensor 19 mounted on spacecraft 10. The ground station transmitted signal may be a coded signal having a prdetermined amplitude determinative of thruster operating time or thruster 12 may only operate for a time period determined by the pulse width of the ground station transmitted signal. Telemetry receiver 14 is any suitable prior art system which processes a received signal from a ground station and transmits the processed ground station signal to logic circuit 15. Spacecraft moments of inertia, $I_x$ and $I_y$, and angular momentum magnitude along the z axis (determined from equation (3)) are information stored in a memory bank in logic circuit 15. Logic circuit 15 is arranged, as would be well known, to one skilled in the art, to compute equation (1) and generate an output logic signal in response to an output signal from receiver 14. The output logic signal from logic circuit 15 is transmitted to firing electronics circuit 16 including a timer, not shown, arranged to respond to the output signal from logic circuit 15 and turn on or fire thruster 12 for time period τ where τ is determined by equation (2). Thruster 12 automatically is turned off and thus deactivated by firing electronics circuit 16 at the end of time period τ. Any known system may be used to achieve such thruster firings as exemplified by the control computer described in U.S. Pat. No. 3,624,367, issued on Nov. 30, 1971 or to the equipment described by FIG. 6 of U.S. Pat. No. 3,637,170, issued on Jan. 25, 1972. It should be noted that firing electronics circuit 16 may include a suitable prior art signal responsive throttle 18 such as disclosed in U.S. Pat. No. 3,231,223 issued on Jan. 25, 1966, for controlling the magnitude of thruster 12 thrust force. Thus, a spacecraft maneuver requiring a desired attitude or orbital adjustment may employ a throttle controlled rocket or thruster operating for at least one nutation period. Also, it should be appreciated that all control signals determining thruster firing period and magnitude of the thrust force may be determined by logic circuits in the ground transmitting station.

Figure 2:
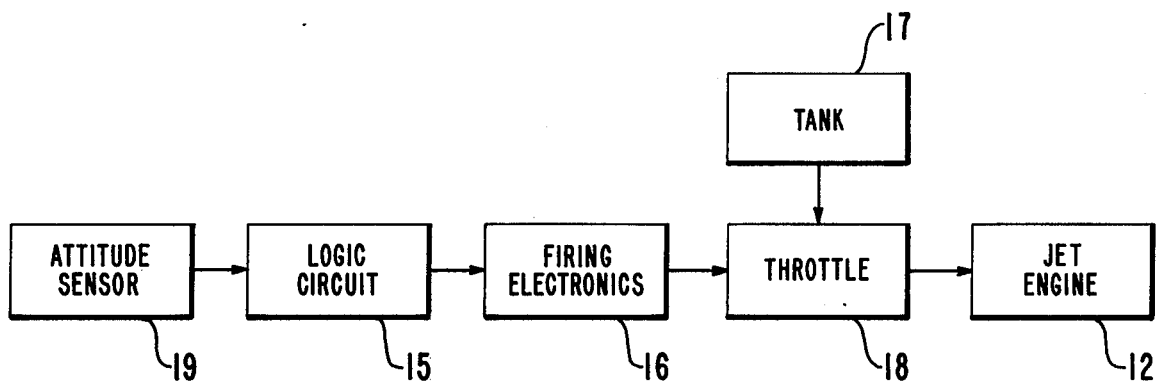
FIG. 2 is a block diagram of a closed loop nutation control system according to the present invention.

In another embodiment, logic circuit 15 may be arranged in a manner well known in the art to compute the thruster operating period, τ, in response to a signal from attitude sensor 19. This embodiment is referred to as a closed loop control system and is shown in FIG. 2. Attitude sensor 19 detects deviations in desired spacecraft attitude and generates an output signal which is coupled to logic circuit 15. Attitude sensor 19, it will be appreciated provides the attitude signal directly to the logic circuit 15 rather than having the attitude signal of sensor 19 being processed through antenna 13, and receiver 14 by way of a ground station command signal. The firing electronics 16, throttle 18, engine 12, and tank 17 cooperate in response to attitude error signals from sensor 19 as described above, for FIG. 1a. Reference is made to FIG. 6 of U.S. Pat. No. 3,944,172 issued on Mar. 16, 1976, which shows the production of controlled thrusts for attitude control in response to signals from a sensor in a closed loop system.

In summary, a control system for minimizing nutation in a spacecraft due to operation of a spacecraft thruster is disclosed. The spacecraft thruster is operated for only a time period equal to the product of an integral number times the nutation period ($2\pi/\omega_n$), whereby spacecraft nutation is minimized.

Although a nutation control system for a de-spun spacecraft has been described, the general principle of nutation control disclosed above is applicable to spinning or dual-spin spacecraft. Variations and modifications may be made without departing from the present invention. Accordingly, it should be understood that the form of the present invention described above and shown in the figures of the accompanying drawing is illustrative only and is not intended to limit the scope of the invention.

What is claimed is:

1. A control system for a spacecraft of the dual-spin type having a spin axis and a characteristic nutation frequency, and further having a platform despun from a spinning member, for eliminating nutation caused by a thrust force not passing through the center of gravity of said spacecraft comprising:
   receiver means included in said spacecraft for receiving signals transmitted to said spacecraft, and generating in response thereto a receiver means output signal; and
   force generating means mounted on said platform and coupled to said receiver means and, in response to said receiver output signal, activating said force generating means for an operating time, τ, wherein said force generating means operating time, τ, is:

$$\tau = \frac{2\pi n}{\omega_n}$$

where n is an integer and $\omega_n$ is said nutation frequency.

2. A control system according to claim 1 wherein said force generating means include a signal responsive throttle means for controlling said thrust force magnitude.

3. A control system according to claim 1 wherein said force generating means includes at least one thruster.

4. A control system for a spacecraft of the dual-spin type having a spin axis and a characteristic nutation frequency, and further having a platform despun from a spinning member, for eliminating nutation caused by a thrust force not passing through the center of gravity of said spacecraft, comprising:
   detector means included in said spacecraft for detecting a deviation from a desired spacecraft attitude, and generating in response thereto a detector means output signal;
   logic means coupled to said detector means and in response to said detector output signal generating a logic output signal; and
   force generating means mounted on said platform and coupled to said logic means and, in response to said logic control output signal activating said force generating means for an operating period, τ, wherein said force generating means operating period, τ, is:

$$\tau = \frac{2\pi n}{\omega_n}$$

where n is an integer and $\omega_n$ is said nutation frequency.

5. A control system according to claim 4 wherein said force generating means includes a signal responsive throttle means for controlling said thrust force magnitude.

6. A control system according to claim 4 wherein said force generating means includes at least one thruster.

7. A method for eliminating spacecraft nutation caused by a thrust force not passing through the center of gravity of said spacecraft, in a spacecraft of the dual-spin type having a spin axis and a characteristic nutation period and further having a platform despun from a spinning member, comprising the steps of:

transmitting signals to a spacecraft receiver means causing a receiver means output signal;
activating a force generating means mounted on said spacecraft in response to said receiver output signal for an operating period, $\tau$;
deactivating said force generating means at the end of said operating period, $\tau$, wherein said force generating means operating period, $\tau$, is:

$$\tau = \frac{2\pi n}{\omega_n}$$

where $n$ is an integer and $\omega_n$ is said nutation frequency.

* * * * *